United States Patent Office 2,798,066
Patented July 2, 1957

2,798,066
METHOD FOR PREPARING CYANINE BASES

Henri Larive, Clichy, and Pierre D. Collet, Vincennes, France, assignors to Eastman Kodak Company, Rochester, N. Y., a corporation of New Jersey No Drawing. Application January 27, 1956, Serial No. 561,930

15 Claims. (Cl. 260—240.7)

The present invention relates to cyanine bases and more particularly to a method for preparing them.

The process according to our invention is characterized particularly in that an intermediate selected from those represented by the following general formula:

(I)
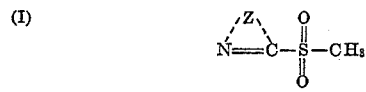

wherein Z represents the nonmetallic atoms necessary to complete a heterocyclic nucleus selected from the group consisting of benzothiazole, naphthothiazole and benzoxazole is condensed with an intermediate selected from those represented by the following general formula:

(II)
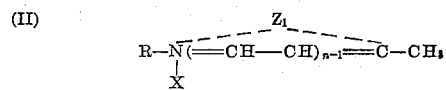

wherein R represents an alkyl group (e. g., methyl, ethyl, n-propyl, isobutyl, n-butyl, n-amyl, isoamyl, carbethoxymethyl, β-hydroxyethyl, carbomethoxymethyl, benzyl, etc.), X represents an acid radical (e. g., chloride, bromide, iodide, perchlorate, thiocyanate, sulphamate, methylsulphate, ethylsulphate, benzenesulphonate, p-toluenesulfonate, xylenesulfonate, etc.), $n$ represents a positive integer of from 1 to 2, and $Z_1$ represents the nonmetallic atoms necessary to complete a heterocyclic nucleus of the 2-quinoline series (e. g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), or those of the 4-quinoline series (e. g., quinoline, 6-methoxyquinoline, 7-methylquinoline, 8-methylquinoline, etc.).

It is therefore an object of our invention to provide a method for preparing cyanine dye bases. Another object is to provide a method for preparing simple cyanine dye bases without first preparing the cyanine dye and purifying the same. Other objects will become apparent from a consideration of the following description and examples.

In accordance with our invention we provide dequaternized cyanines in a single step, which is an important advantage of our process. On the other hand, according to a known method for preparing dequaternized cyanines, it is necessary to dequaternize a cyanine dye previously prepared, such an operation demanding the action of an organic base at a relatively high temperature which frequently entails undesirable transformations or decompositions. In addition, this method is advantageously applicable only to symmetrical cyanine dyes. According to another known method for preparing dequaternized cyanines, the reactivity of a thio-ether group on a reactive methyl group of a quaternary salt is used; one disadvantage of this latter method being that fetid, poisonous mercaptans are evolved, which is an important source of troubles when substantial quantities of dequaternized cyanines must be prepared. In our invention dequaternized unsymmetrical cyanine dyes can be obtained in a single step without the evolution of mercaptan.

The condensation of the compounds of Formula I with those of Formula II provide dequaternized cyanine dyes represented by the following general formula:

(III)
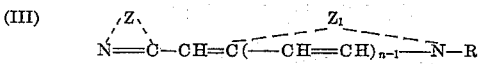

wherein R, Z, $Z_1$, and $n$ each have the values given above.

We have also found that compounds corresponding to those of Formula I wherein Z represents the nonmetallic atoms necessary to complete a heterocyclic nucleus of the thiazole series (e. g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), can be quaternated (by heating with $R_1X_1$) to give products represented by the formula:

(IV)
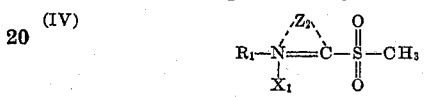

wherein $R_1$ represents an alkyl group (e. g., methyl, ethyl, etc.), $X_1$ represents an acid radical (e. g., such radicals as defined by X above and $Z_2$ represents the nonmetallic atom necessary to complete a heterocyclic nucleus of the thiazole series (as defined above) and that these quaternated compounds can be condensed with the intermediates of Formula II to provide cyanine dyes represented by the following general formula:

(IIIb)
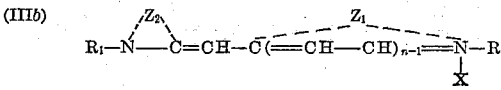

wherein R, $R_1$, $Z_1$, $Z_2$, X and $n$ each have the values given above, also we have found that the compounds of Formula IV can be condensed with a compound selected from those represented by the following formula:

(IIa)
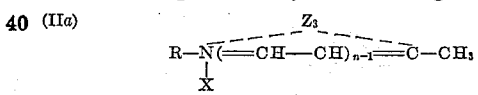

wherein R, $n$ and X each have the values given above and $Z_3$ represents the nonmetallic atoms necessary to complete a heterocyclic nucleus containing from 5 to 6 atoms in the heterocyclic ring, such as those of the thiazole series (e. g., those defined by $Z_2$ above), those of the benzothiazole series (e. g., those defined by Z above), those of the naphthothiazole series (e. g., those defined by Z above), those of the oxazole series (e. g., 4 - methyloxazole, 5 - methyloxazole, 4 - phenyloxazole, 4,5 - diphenyloxazole, 4 - ethyloxazole, 4,5 - dimethyloxazole, 5-phenyloxazole, etc.), those of the benzoxazole series (e. g., those defined by Z above), those of the naphthoxazole series (e. g., α-naphthoxazole, β-naphthoxazole, etc.), those of the selenazole series (e. g., 4-methylselenazole, 4-phenylselenazole, etc.), those of the benzoselenazole series (e. g., benzoselenazole, 5-methoxybenzoselenazole, 5-hydroxybenzoselenazole, tetrahydrobenzoselenazole, etc.), those of the naphthoselenazole series (e. g., α-naphthoselenazole, β-naphthoselenazole, etc.), those of the thiazoline series (e. g., thiazoline, 4-methylthiazoline, etc.), those of the 2-quinoline series (e. g., those defined by $Z_1$ above), those of the 4-quinoline series (e. g., those defined by $Z_1$ above) those of the 1-isoquinoline series (e. g., isoquinoline, 3,4-dihydroisoquinoline, etc.), those of the 3-isoquinoline series (e. g., isoquinoline, etc.), those of the 3,3-dialkylindolenine series (e. g., 3,3-dimethylindolenine, 3,3,5-trimethylindolenine, 3,3,7-trimethylindolenine, etc.), those of the 2-pyridine series (e. g., pyridine, 3-methyl-pyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g., 2-methylpyridine, 2,6-dimethylpyridine, 3-methylpyridine, 2,3-dimethylpyridine, 2,5-dimethylpyridine, 2-hydroxypyridine, 3-hydroxypyridine, etc.), etc. The resulting dyes can advantageously be represented by the following formula:

(IIIc) 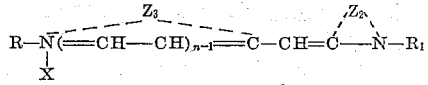

wherein R, $R_1$, X, $n$, $Z_2$ and $Z_3$ each have the values given above.

The compounds of Formula IV can also be condensed with a ketomethylene compound selected from those represented by the following general formula:

(V) 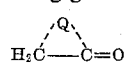

wherein Q represents the non-metallic atoms necessary to complete a heterocyclic nucleus containing from 5 to 6 atoms in a heterocyclic ring, such as those of the thiazolone series, those of the 2-thio-2,4(3,5)-thiazoledione (rhodanine) series, those of the imidazolone series, those of the 2-thiohydantoin series, those of the oxazolone series, those of the pseudohydantoin series, those of the thianaphthenone series, those of the pyrazolone series, those of the oxindole series, those of the thiobarbituric acid series, those of the barbituric acid series, etc. (e. g., such nuclei as are defined by Q in our U. S. Patent 2,708,669, issued May 17, 1955). The resulting products can be represented by the following general formula:

(VI) 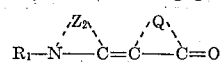

wherein $R_1$, $Z_2$ and Q have the values given above.

We have further found that the compounds of Formula IIIb can be prepared by condensing a compound represented by the following general formula:

(VII) 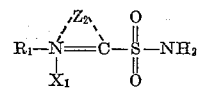

wherein $R_1$, $X_1$, and $Z_2$ have the values given above, with a compound of Formula II. The compounds of Formula VI can also be prepared by condensing a compound of Formula VII with a compound of Formula V.

We have also found that compounds selected from those represented by the following general formula:

(VIII) 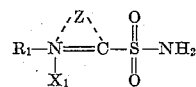

wherein $R_1$, $X_1$, and Z have the values given above, can be condensed with either the compounds of Formula IIa or V, to give compounds represented by the following general formulas, respectively:

(IIId) 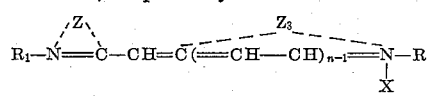

wherein R, $R_1$, Z, $Z_3$, X and $n$ each have the values given above, and:

(VIa) 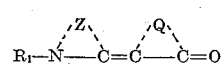

wherein $R_1$, Z and Q have the values given above. The compounds of Formula IIId can also be prepared by condensing a compound of Formula Ia with a compound of Formula IIa, while the compounds of Formula VIa can be prepared by condensing a compound of Formula Ia with a compound of Formula V.

All of the above condensation can be accelerated by heat, temperatures from about 20° C. to the reflux temperature of the reaction mixture being suitable. Basic condensing agents, such as the organic tertiary amines (e. g., triethylamine, tri-n-propylamine, tri-n-butylamine, triisobutylamine, etc.), N-alkylpiperidines (e. g., N-methyl and N-ethylpiperidines, etc.), N,N-dimethylaniline, N,N-diethylaniline, etc. can be employed. A solvent such as pyridine, ethanol, propanol, isopropanol, butanol, isobutanol, etc. can also be employed in the condensations.

The compounds represented by Formula VII above can be prepared by quaternation (by heating with $R_1X_1$) of a compound of the following formula:

(VIIa) 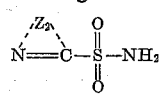

wherein $Z_2$ has the values given above, while the compounds of Formula VIII can be prepared by quaternation (by heating with $R_1X_1$) of a compound of the following formula:

(VIIIa) 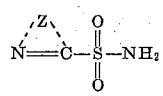

The compounds of Formula I, and those corresponding to Formula I wherein Z represents a thiazole nucleus can be prepared according to the method described in "Jour. Chem. Soc." (London, 1949), p. 3311–25. This method comprises oxidation by potassium permanganate of an acetic acid solution of a compound of the formula:

(IX) 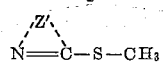

wherein Z' represents the nonmetallic atoms necessary to complete a heterocyclic nucleus of the thiazole, benzothiazole, naphthothiazole or benzoxazole series (corresponds to Z and $Z_2$ above). The compounds of Formula IX are, of course, well-known and can be prepared as described in British Patent 424,559, accepted February 18, 1935.

The compounds of Formulas VIIa and VIIIa can be prepared by reacting ammonia with a compound of the formula:

(X) 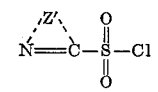

wherein Z' has the values given above. The compounds of Formula X can be prepared by the method of Roblin et al. ("J. A. C. S.," vol. 72, p. 4891). This method comprises oxidizing an aqueous acetic acid solution of a compound selected from those represented by Formula IX with chlorine gas.

The following examples will serve to further characterize our invention.

*Example I.—2-(1-ethyl-2-quinolylidene)-methylbenzothiazole*

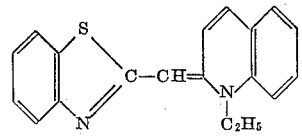

A solution of 2.1 g. of 2-benzothiazolyl-methyl-sulphone, 3 g. of quinaldine ethiodide and 3 cc. of triethylamine in 100 cc. of ethyl alcohol, was heated under reflux for half-an-hour. After cooling, a small quantity of a green, insoluble material was separated. The alcoholic solution was precipitated by 100 g. of water and ice. A red dye was obtained, drained, dried and extracted by 50 cc. of dry benzene, then reprecipitated by adding ligroin. The product was recrystallized in diisobutylene. 0.9 g, of dequaternized cyanine having the formula shown above was obtained.

Analysis.—N, calculated, 9.25%; H, calculated, 5.25%. N, found, 9.35%; H, found, 5.35%.

*Example II.—2-(1-ethyl-2-quinolylidene)-methylbenzoxazole*

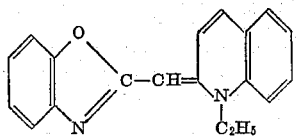

A solution of 2 g. of 2-benzoxazolyl-methyl-sulphone, 3 g. of quinaldine ethiodide and 3 cc. of triethylamine in 100 cc. of ethyl alcohol was heated under reflux, for half-an-hour. The product was precipitated with water and ice and a red dye was obtained, then drained, dried and recrystallized in a mixture of benzene and ligroin. 1.5 g. of a dequaternized cyanine corresponding to the formula shown above was obtained.

Analysis.—N, calculated, 9.75%; H, calculated, 5.6%. N, found, 9.9%; H, found, 5.7%.

*Example III.—2-(1-ethyl-2-quinolylidene)methyl-α-naphthothiazole*

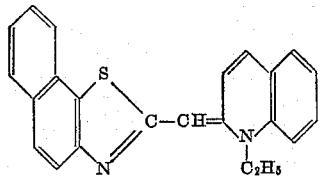

A solution of 1.3 g. of 2-α-naphthothiazolyl-methyl-sulphone, 1.5 g. of quinaldine ethiodide and 1.5 cc. of triethylamine in 65 cc. of ethyl alcohol was heated under reflux for half-an-hour. After cooling, the product was precipitated by 100 cc. of water and ice, drained and dried. Then it was extracted with benzene and the benzene solution was precipitated by ligroin. 0.45 g. of a dark red dye corresponding to the formula shown above was obtained.

Analysis.—S, calculated, 9.04%; S, found, 9.10%.

*Example IV.—3,4-dimethyl-1'-ethylthiazole-2'-cyanine iodide*

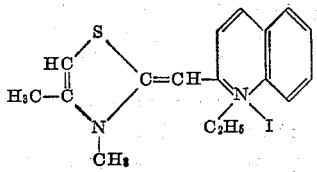

A solution of 0.3 g. of 4-methylthiazolyl-methyl-sulphone methylsulphate, 0.35 g. of quinaldine ethyl-p-toluenesulphonate and 0.5 cc. of triethylamine in 10 cc. of ethyl alcohol was heated under reflux, for a quarter of an hour. A red coloration developed. The product was poured into a solution of 1.4 g. of potassium iodide in 10 cc. of water. The dye precipitated. After cooling, it was washed with cold water, dried and recrystallized in ethyl alcohol. 0.2 g. of beautiful red dye corresponding to the formula shown above was obtained.

Analysis.—I, calculated, 30.9%; I, found, 30.8%.

The sulphone quaternary salt used in Example IV was prepared as follows: 10 cc. of methyl sulphate were added to 17.7 g. of 4-methylthiazolyl-methyl-sulphone. This mixture was protected with a calcium chloride tube and left at ordinary temperature for one week. The resulting solid was washed with ether, dissolved in the minimum quantity of ethyl alcohol and reprecipitated in anhydrous ether.

Analysis.—S, calculated, 31.6%; S, found, 32.1%.

*Example V.—3,4-dimethyl-3'-ethylthiazolothiacyanine iodide*

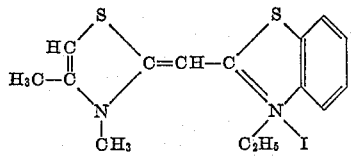

A solution of 4-methylthiazolylmethyl-sulphone-methylsulphate prepared as indicated above and 0.6 g. of 2-methylbenzothiazole ethiodide in 20 cc. of ethanol was heated under reflux for a quarter of an hour with 1 cc. of triethylamine. After boiling for 15 minutes, the product was cooled and drained. 0.35 g. of a yellow dye corresponding to the formula shown above was obtained.

Analysis.—I, calculated, 30.5%; I, found, 30.7%.

*Example VI.—3-ethyl-5-(3,4-dimethyl-2(3)-thiazolylidene)-2-thio-2,4(3,5)-oxazoledione*

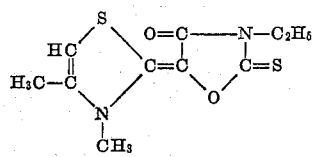

A mixture of 0.6 g. of 4-methylthiazolyl-methyl-sulphone methylsulphate, prepared as indicated above, and 0.3 g. of 3-ethyl-2-thio-2,4 (3,5)-oxazoledione in 20 cc. of ethyl alcohol was heated under reflux with 1 cc. of triethylamine. After a quarter of an hour, a yellow dye separated upon cooling. By recrystallizing in ethyl alcohol, 0.2 g. of a merocyanine dye corresponding to the formula shown above was obtained.

*Example VII.—3-methyl-1'-ethylthia-2'-cyanine iodide*

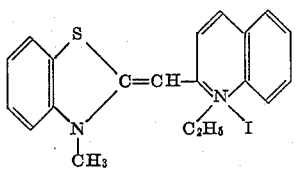

A mixture of 2.1 g. of 2-benzothiazolylsulphonamide and 1 cc. of methyl sulphate was heated at 120° C. for two hours. The resulting vitrous product was washed with ether and a crude quaternary salt was obtained, which was 2-benzothiazolylsulphonamide-methylsulphate.

A solution in ethyl alcohol of 2.9 g. of quinaldine ethiodide, of all the quaternary salt prepared as described above and of 3 g. of triethylamine was heated under reflux. After heating under reflux for half-an-hour the product was cooled and drained. 0.8 g. (18%) of the cyanine dye corresponding to the formula shown above was obtained.

Other cyanines, either quaternized or not, and other merocyanines can be prepared in a manner similar to that described in Examples I to VII.

*Example VIII.—Preparation of 2-methylmercaptobenzothiazole*

167 g. of mercaptobenzothiazole were dissolved in 1200 cc. of a normal solution of caustic soda. A small quantity of insoluble material was separated by filtration. The solution obtained was externally cooled, then very vigorously stirred in a 2000 cc. flask. Within one hour, 100 cc. of neutral methyl sulphate were slowly dropped in, then stirring was continued for about two hours at a low temperature. The oil which separated out was crystallized by cooling and seeding. The product was then drained, dried and recrystallized in a mixture of 80/100 of alcohol and 20/100 of ether. About 130 g. (71%) of well crystallized 2-methylmercaptobenzothiazole, melting at 46° C. were obtained.

Example IX.—Preparation of benzothiazolyl-methyl-sulphone

This compound was prepared according to the method indicated in Jl. Chem. Soc., 1949, p. 3311-25. 18 g. of methylmercaptobenzothiazole were dissolved in 150 cc. of acetic acid. The mixture was stirred and a solution of 33 g. of potassium permanganate in 500 cc. of water was slowly dropped in. The temperature should not raise above 20° C. After an hour, 1000 cc. of water were added and the manganese dioxide which had precipitated was reduced by a gaseous current of sulphur dioxide. The flask had to be cooled, as the reduction was very exothermic. The product was drained, washed with water, dried in air and twice recrystallized in five volumes of ethyl alcohol. 12 g. of a well crystallized white product, melting at 90° C., were obtained.

*Analysis.*—S, calculated, 30%; S, found, 29.9%.

Example X.—Preparation of 2-methylmercaptobenzoxazole

This compound was prepared by the method described in Jl. Chem. Soc., 1949, p. 3312. 16.5 g. of 2-mercaptobenzoxazole were dissolved in 110 cc. of a normal solution of caustic soda. The product was stirred for two hours, at room temperature, with a solution of 11 cc. of methyl iodide in 55 cc. of ethyl alcohol. The mixture was allowed to stand for two days, extracted by 200 cc. of ether three times (100 cc.+50 cc. +50 cc.), dried on anhydrous sodium sulphate. Ether was removed and a yellow brown oil was obtained which could be used directly for oxidation into the sulphone, as indicated in Example XI.

Example XI.—Preparation of benzoxazolyl-methyl-sulphone

The oil obtained in Example X was dissolved in 165 cc. of acetic acid. The product was cooled and stirred and a solution of 36.3 g. of potassium permanganate in 1100 cc. of water was slowly dropped, so that the temperature should not raise above 20° C. The mixture was allowed to stand for one night, then 1000 g. of ice were added. Sulphur dioxide was bubbled through until complete dissolution was obtained. The product was drained, washed with water, dried on a porous plate then under phosphoric vacuum. The product obtained (7 g.) was dissolved in 50 cc. of dry benzene at 50° C., then the solution was decolorized with charcoal and reprecipitated by 100 cc. of hexane. Finally, it was drained, dried in an oven in the presence of paraffin chips. 6 g. of a waxy product were obtained.

Example XII.—Preparation of 2-methylmercapto-α-naphthothiazole 21.7 g. of 2-mercapto-α-naphthothiazole were dissolved in a half-normal solution of caustic soda. The solution was stirred and cooled to 50° C., while 11.2 cc. of methyl sulphate were slowly introduced. The product was allowed to stand for two hours, then drained, washed with water and recrystallized in methyl alcohol (6 cc. per gram). 17 g. (73.6%) of a white product were obtained.

Example XIII.—Preparation of α-naphthothiazolyl-methyl-sulphone 7.5 g. of 2-methylmercapto-α-naphthothiazole were dissolved in 50 cc. of crystallizable acetic acid. The solution was stirred and a solution of 11 g. of potassium permanganate in 165 cc. of water was slowly introduced. The temperature must not raise above 20° C. The product was allowed to stand for one hour, then 200 g. of ice were added and a stream of sulphur dioxide was passed until complete decolorization. The product was dried on a porous plate and recrystallized in alcohol. 6 g. of product were obtained. A sample recrystallized in ligroin melted at 142° C.

*Analysis.*—S, calculated, 24.25%; S, found 24.55%.

Example XIV.—Preparation of 2-methylmercapto-4-methylthiazole

This compound can be prepared according to the indications of Jl. Org. Chem., 1941, 6, p. 764. 180 g. of a freshly distilled monochloracetone were slowly added, while stirring and cooling, to a suspension of 215 g. of dry ammonium dithiocarbamide in 420 cc. of anhydrous ethyl alcohol. Heat was evolved and the ammonium chloride obtained was drained and washed with absolute alcohol. The filtrate was evaporated under light depression. A brown oil was obtained and, after standing for two days, set to a brownish crystalline mass. This product is directly employed for the methylation.

The resulting crude 2-mercapto-4-methylthiazole was broken in a mortar, then 100 cc. of methyl iodide were slowly added into the mortar, while grinding was continued. Heat was evolved, then the product set. The product was then ground up with ether, drained, and washed again with ether. It was dissolved in 600 cc. of water in which a few cc. of 10 N-hydrochloric acid had been added. By decantation of an insoluble tarry portion, a solution was obtained and neutralized with sodium carbonate until carbon dioxide was no longer evolved. The oil which separated was extracted with chloroform, the solvent was distilled off, 500 cc. of water were added, the oil was distilled with steam, the yellow oil was decanted and the mother-liquors were extracted with ether. The ether extract in the dectanted oil was dried for one night on sodium sulphate. The solvent was removed and the oil was rectified under vacuum. 176 g. of a pale yellow oil with a boiling point of 83–85° C. under 11 mm. of mercury were obtained. The melting point of the picrate was 123°–5° C. (after recrystallizing in ethyl acetate).

Example XV.—Preparation of 4-methylthiazolyl-methyl-sulphone

A solution of 66 g. of potassium permanganate in 1000 cc. of water was slowly added, within two hours, to a solution of 29 g. of 2-methylmercapto-4-methylthiazole in 200 cc. of acetic acid. The temperature was maintained between 10 and 15° C. The product was allowed to stand overnight, then, while vigorously cooling and stirring, the solution was decolorized by bubbling through sulphur dioxide. A blue fluorescence was emitted by the colorless solution. The water was evaporated under vacuum, the residue was extracted with ether and the solution was dried upon sodium sulphate. The solvent was removed and the product was twice dried under vacuum. Between 186° and 188° C., under 26 mm. of mercury, 10 g. (30%) of a very little mobile, colorless oil were separated.

*Analysis.*—S, calculated, 36.2%; N, calculated, 7.9%; S, found, 37%; N, found, 8.2%.

Example XVI.—Preparation of 2-benzothiazolylsulphonamide

First, benzothiazolylsulphonic chloride was prepared, according to the indications of Roblin et al., Jl. Am. Chem. Soc., 1950, vol. 72, p. 4891, by oxidizing mercaptobenzothiazole in solution in aqueous acetic acid, with a prolonged chlorine stream. The sulphonic chloride thus obtained must be rapidly dried on a porous plate. Even when dry, the product decomposed slowly and evolved sulphur dioxide and chlorobenzothiazole. Liquid ammonia was allowed to react on the resulting sulphochloride, as indicated in J. A. C. S., 1950, p. 4892. The product was purified by dissolving in a half-normal solution of caustic soda, then reprecipitated by acetic acid and recrystallized in water. Sulphonamide was obtained with a yield of 20%. Melting point: 177° C.

Many of the cyanine dye bases and dyes obtained according to our invention can be employed as optical sensitizers for photographic silver halide emulsions, serving to alter the sensitivity thereof. Some of the cyanine dye bases obtained in our invention can be used in photographic filter and backing layers, such as those of the type described in U. S. Patent 2,500,045.

What we claim as our invention and desire secured by Letters Patent of the United States is:

1. A method for making simple cyanine dye bases comprising condensing a compound selected from those represented by the following general formula:

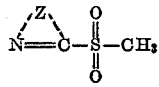

wherein Z represents the non-metallic atoms necessary to complete a heterocyclic nucleus selected from the group consisting of benzothiazole, naphthothiazole, benzoxazole, with a compound selected from those represented by the following general formula:

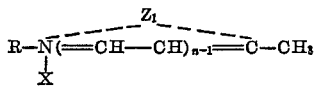

wherein R represents an alkyl group, X represents an acid radical, $n$ represents a positive integer of from 1 to 2, and $Z_1$ represents the non-metallic atoms necessary to complete a heterocyclic nucleus of the quinoline series.

2. A method according to claim 1 wherein the condensation is carried out in the presence of an organic tertiary amine.

3. A method according to claim 2 wherein the organic tertiary amine is triethylamine.

4. A method for making simple cyanine dye bases comprising condensing 2-benzothiazolyl-methyl-sulphone together with a compound selected from those represented by the following general formula:

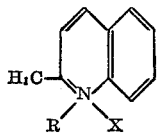

wherein R represents a lower alkyl group and X represents an acid radical.

5. A method for making simple cyanine dye bases comprising condensing in the presence of an organic tertiary amine 2-benzothiazolyl-methyl-sulphone together with a compound selected from those represented by the following general formula:

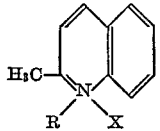

wherein R represents a lower alkyl group and X represents an acid radical.

6. A method for making simple cyanine dye bases comprising condensing 2-benzoxazolyl-methyl-sulphone together with a compound selected from those represented by the following general formula:

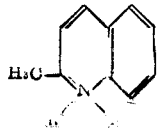

wherein R represents a lower alkyl group and X represents an acid radical.

7. A method for making simple cyanine dye bases comprising condensing in the presence of an organic tertiary amine 2-benzoxazolyl-methyl-sulphone together with a compound selected from those represented by the following general formula:

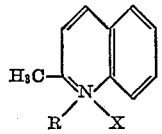

wherein R represents a lower alkyl group and X represents an acid radical.

8. A method for making simple cyanine dye bases comprising condensing 2-α-naphthothiazolyl-methyl-sulphone together with a compound selected from those represented by the following general formula:

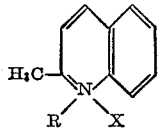

wherein R represents a lower alkyl group and X represents an acid radical.

9. A method for making simple cyanine dye bases comprising condensing in the presence of an organic tertiary amine 2 - α - naphthothiazolyl - methyl - sulphone together with a compound selected from those represented by the following general formula:

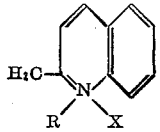

wherein R represents a lower alkyl group and X represents an acid radical.

10. A method for making 2-(1-ethyl-2-quinolylidene) methyl-benzothiazole comprising condensing together 2-benzothiazolylmethyl-sulphone and quinaldine ethiodide in the presence of an organic tertiary amine.

11. A method according to claim 10 wherein the organic tertiary amine is triethylamine.

12. A method for making 2-(1-ethyl-2-quinolylidene) methylbenzoxazole comprising condensing together 2-benzoxazolyl-methyl-sulphone and quinaldine ethiodide in the presence of an organic tertiary amine.

13. A method according to claim 12 wherein the organic tertiary amine is triethylamine.

14. A method for making 2-(1-ethyl-2-quinolylidene) methyl-α-naphthothiazole comprising condensing together 2-α-naphthothiazolyl-methyl-sulphone and quinaldine ethiodide in the presence of an organic tertiary amine.

15. A method according to claim 14 wherein the organic tertiary amine is triethylamine.

No references cited.